United States Patent
Slatter et al.

(10) Patent No.: US 7,007,911 B2
(45) Date of Patent: Mar. 7, 2006

(54) METHOD FOR SUPPORTING A BOATING ACCESSORY

(75) Inventors: Stephen O. Slatter, Sunrise, FL (US); William E. Kushner, Miami, FL (US); Jon E. Kushner, Miami, FL (US)

(73) Assignee: Taco Metals, Inc., Miami, FL (US)

( * ) Notice: Subject to any disclaimer, the term of this patent is extended or adjusted under 35 U.S.C. 154(b) by 0 days.

(21) Appl. No.: 10/852,053

(22) Filed: May 24, 2004

(65) Prior Publication Data
US 2004/0232292 A1 Nov. 25, 2004

Related U.S. Application Data

(60) Provisional application No. 60/473,303, filed on May 23, 2003.

(51) Int. Cl.
*A01K 97/10* (2006.01)
(52) U.S. Cl. .................................... 248/534; 43/21.2
(58) Field of Classification Search ............... 248/214, 248/205.1, 538, 539, 534; 114/255, 364; 43/21.2
See application file for complete search history.

(56) References Cited

U.S. PATENT DOCUMENTS

| | | | |
|---|---|---|---|
| 1,257,073 A * | 2/1918 | Frank ......................... | 114/364 |
| 4,283,152 A | 8/1981 | Smith et al. .................. | 256/68 |
| 5,673,507 A * | 10/1997 | Stokes, Jr. .................... | 43/21.2 |
| 6,851,654 B1 * | 2/2005 | Slatter ......................... | 248/314 |
| 2004/0000623 A1 * | 1/2004 | Slatter ......................... | 248/534 |
| 2004/0035350 A1 * | 2/2004 | Rupp ............................ | 114/364 |
| 2005/0045785 A1 * | 3/2005 | Cohen .......................... | 248/214 |

OTHER PUBLICATIONS

U.S. Appl. No. 10/852,363, filed May 2004.

* cited by examiner

*Primary Examiner*—Ramon O. Ramirez
(74) *Attorney, Agent, or Firm*—Robert M. Schwartz

(57) ABSTRACT

A multi-purpose support plate for use with a boating accessory assembly is disclosed. The multi-purpose support plate includes a first mounting end portion having a first clamping region, a center portion having a top layer, a bottom layer, and a central bore, a second mounting end portion having a second clamping region positioned opposite said first mounting end portion, wherein the first and second clamping regions are in removable engagement with an accessory clamp operatively engaged to a boating structure. The first and second clamping regions are affixed to a boat structure by at least one accessory clamp assembly, the accessory clamp assembly being constructed to fit the mounting end portions at their respective clamping regions by frictional engagement.

3 Claims, 5 Drawing Sheets

METHOD FOR SUPPORTING A BOATING ACCESSORY

CROSS-REFERENCE TO RELATED APPLICATIONS

This application claims the benefit of U.S. Provisional Application Ser. No. 60/473,303, filed on May 23, 2003, entitled CLAMP-ON MULTI-PURPOSE SUPPORT PLATE.

TECHNICAL FIELD OF THE INVENTION

This invention relates to the field of sport fishing, and particularly to an outrigger mounting system having a multi-purpose support plate capable of withstanding high forces and permitting rotational movement of an outrigger.

BACKGROUND OF THE INVENTION

Saltwater sport fishing typically consists of anglers positioned on boats that are then dispatched to prolific offshore fishing areas. One useful method of catching game fish involves a technique known as trolling. Trolling is the practice of baiting hooks that are subsequently lowered and dragged behind the stern of a slow moving vessel by the angler. In order to increase the chances of hooking a fish, it is beneficial to have as many lines in the water as possible. To a game fish, the wake of a vessel generally creates the appearance of a large school of smaller fish to be preyed upon. The angler can strategically simulate bands of straggling or displaced fish from the school with numerous baited lines. These simulated straggling fish are misinterpreted by the game fish to be the disadvantaged and weakened fish that game fish frequently utilize as a food source.

As stated above, an angler will often drag as many baited lines from behind the boat as possible, thereby increasing the chances of hooking a fish. However, as more baited lines are used, the probability of the lines becoming entangled with one another increases. This is a problem that occurs in a variety of situations, such as with a narrow beam boat or any boat that is in the process of being turned. As a result, sport fishing outriggers have been developed to assist in keeping the various lines separated. However, the positioning and lowering of outrigger booms presents additional problems of rotational movement and preventing the booms from contacting the water. This problem has brought forth various attempts to create mechanisms to rotate the boom and that prevent the boom from contacting the water.

Outriggers consist of a long pole, or boom, having one end secured to the boat with deployment resulting from an outward lateral extension of the boom from a side of the boat. Baited fishing lines often have integrated release clips that are attached to the outriggers, thereby providing sufficient separation between the lines to prevent tangling. When a fish is hooked on the bait line, the line clip releases from the outrigger, thus allowing the angler to reel in the fish.

Outriggers are required to be freely stowable to a position beside the boat for close quarters operation and docking. For practicality, the outrigger should be swung laterally outward to its deployed position. The prior art includes various types of mounting schemes including outrigger units for horizontal and vertical mounting, on center consoles, flybridges, half towers, tuna towers, radar arches, and/or T-tops. Prior patents disclose a variety of methods for mounting such outriggers into place (see e.g. U.S. Pat. Nos. 6,213,441 and 5,685,107), with each having distinct drawbacks. Such drawbacks include overall mechanical complexity; powered operation; non-durable construction; and/or ineffective position adjustment and locking mechanisms that slip and/or wear out.

Outrigger poles often extend outwardly from the boat to a significant distance while in their fishing position. Due to the forces applied to the mount by a combination of the weight of the outrigger assembly with the outrigger, the rotational movement of the boat, the wind force and the forces associated with trolling, an extremely sturdy structure is essential in order to provide suitable performance over a period. Various outrigger mounts currently supply bracing struts and rods to provide the requisite strength. These structures can be cumbersome in operation, particularly when it becomes necessary to reposition the outrigger.

A number of outrigger mounts employ telescoping or sliding joints that are particularly susceptible to corrosion and sticking, particularly in conjunction with salt water fishing. Furthermore, outrigger mounts of the prior art often require an array of independent attachments to the boat structure in specific relation to each other, thus necessitating skilled and protracted installation, as well as additional structural reinforcement to the boat.

In addition, the prior art outrigger mounts present extended sleeve sockets for the slidable receipt of the proximal ends of the outriggers. Due to the degree of support required for the outrigger, a secure fit between the proximal end and the sleeve socket is essential. Thus, the outriggers are frequently extremely difficult to remove from the sockets after a prolonged period of usage, particularly in salt water, and often call for dismounting at least a portion of the outrigger mount.

The prior art presents a variety of approaches that have been engaged to suspend an outrigger in place while trolling for fish. Notwithstanding these efforts to provide suitable outrigger mounts, the existing prior art devices are limited in numerous respects. Accordingly, what is lacking that the prior art has not provided is a simple multi-purpose support plate for a boating accessory assembly, such as an outrigger assembly, that is capable of withstanding high forces while permitting rotational movement of an outrigger without using bracing struts and rods or sleeve sockets.

SUMMARY OF THE INVENTION

The present invention eliminates the above-mentioned needs for a support plate by providing a clamp-on multi-purpose support plate for a boating accessory assembly that is capable of withstanding high forces while permitting rotational movement.

In accordance with the present invention, there is provided a multi-purpose support plate for use with a boating accessory assembly. The multi-purpose support plate includes a first mounting end portion having a first clamping region, a center portion having a top layer, a bottom layer, and a central bore, a second mounting end portion having a second clamping region positioned opposite said first mounting end portion, wherein the first and second clamping regions are in removable engagement with an accessory clamp operatively engaged to a boating structure. The first and second clamping regions are affixed to a boat structure by at least one clamp, the clamp being constructed to fit the mounting end portions at their respective clamping regions by frictional engagement.

The present invention is further directed to a method for supporting a boating accessory. The method includes the steps of providing a multi-purpose support plate having at least one accessory opening and clamping the multi-purpose support plate to a surface of a boating structure with an accessory clamp assembly, wherein the multi-purpose support plate is clamped on at least one clamping region of the multi-purpose support plate.

Accordingly, it is an objective of the present invention to disclose a sport fishing multi-purpose support plate that is capable of both withstanding high forces and permitting rotational movement of boating accessories, as well as being releasably engaged to a boating structure.

DETAILED DESCRIPTION OF THE INVENTION

Figure 1:
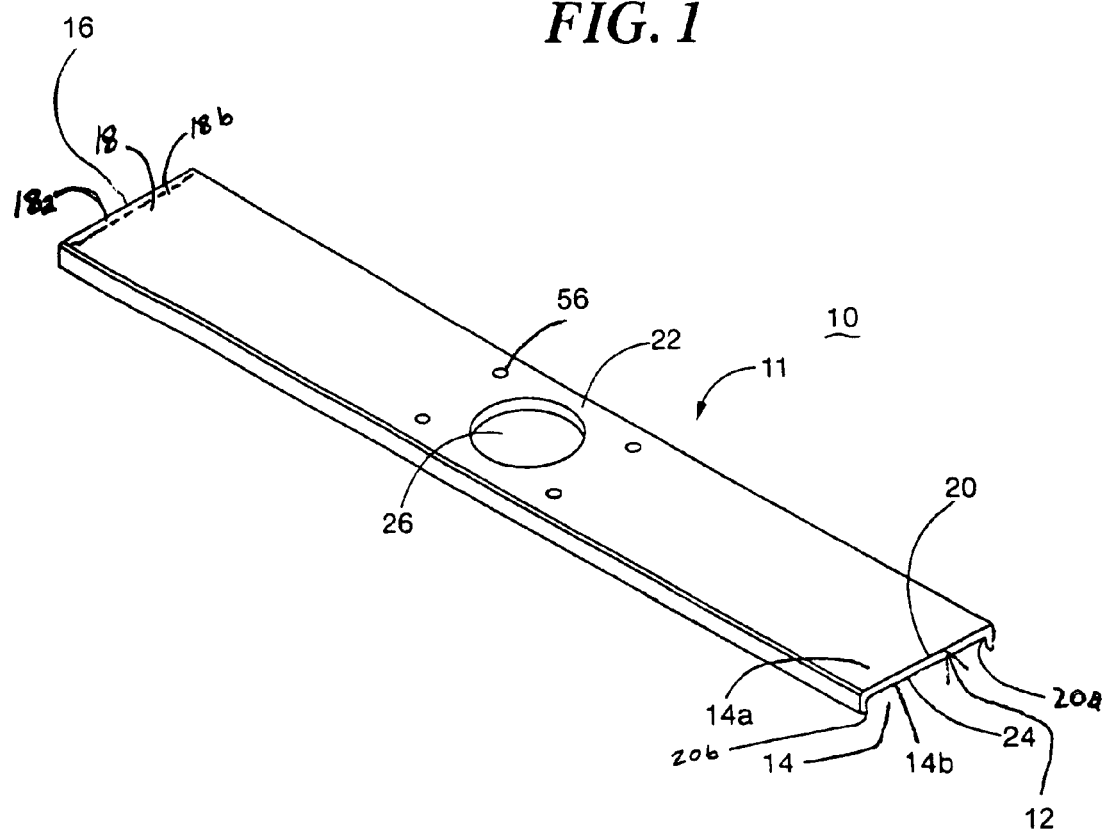
FIG. 1 is an isometric top view of the clamp-on multi-purpose support plate of the preferred embodiment of the present invention.

Referring now to FIG. 1, a portion of the multi-purpose support plate assembly 10 is illustrated as multi-purpose support plate 11. Multi-purpose support plate 11 includes a first mounting end portion 12, a second mounting end portion 16, and a center portion 20.

First mounting end portion 12 includes a first clamping region 14 for attachment to an accessory clamp, such as accessory clamp 27 of FIG. 2 (detailed below). First clamping region 14 is preferably formed from first mounting end portion 12. First clamping region 14 further includes first surface 14a and opposing second surface 14b. First and second surfaces 14a and 14b provide engagement surfaces for the accessory clamp, such as accessory clamp 27 of FIG. 2.

As with first mounting end portion 12, second mounting end portion 16 includes a second clamping region 18 for additional attachment to another accessory clamp, such as accessory clamp 27 of FIG. 2 (discussed below). Second clamping region 18 is preferably formed from second mounting end portion 16. Second clamping region 18 further includes first surface 18a and opposing second surface 18b. First and second surfaces 18a and 18b provide engagement surfaces for the accessory clamp, such as accessory clamp 27 of FIG. 2.

Between first mounting end portion 12 and second mounting end portion 16 is center portion 20. Center portion 20 includes a top layer 22, a bottom layer 24, and preferably a central bore 26. Central bore 26 passes through both the top layer 22 and the bottom layer 24. The benefit of central bore 26 in general is that it is pre-drilled and used to accommodate a boating accessory, such as an outrigger assembly, a light, or the like, that requires passage through multipurpose support plate 11. If the accessory does not require passage there through, then central bore 26 is not required. Bolt holes 56 are disposed in the center portion 20.

Specifically, central bore 26 permits a portion of the boating accessory assembly, such a handle, to pass through central bore 26 of multi-purpose support plate 11. In doing so, central bore 26 further allows for a boating accessory assembly to be engaged in rotational movement within multi-purpose support plate 11. This is particularly useful for boating accessories, such as outriggers, that function better when they are less restricted in movement.

Figure 2:
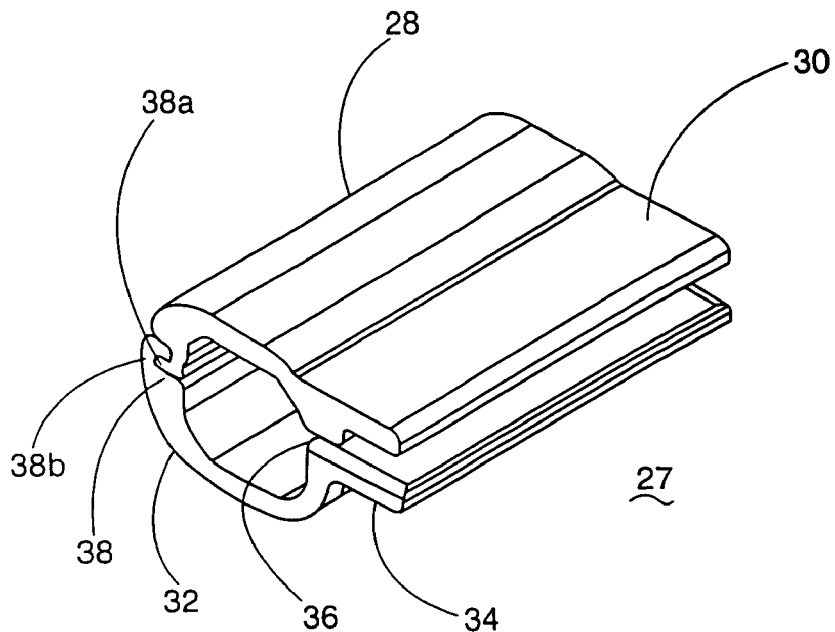
FIG. 2 is an isometric top view of the accessory clamp of the preferred embodiment of the present invention.
Figure 3:
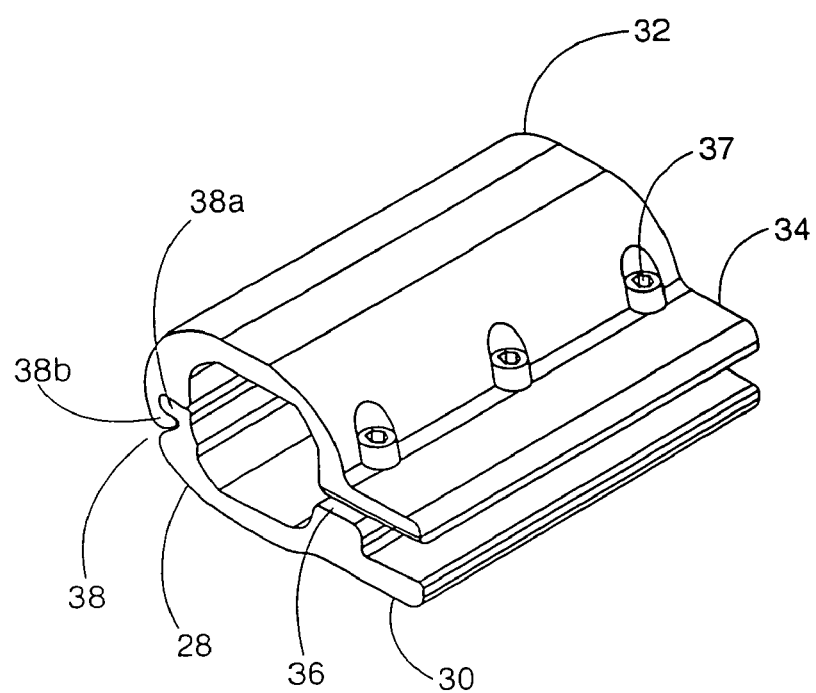
FIG. 3 is an isometric bottom view of the accessory clamp of FIG. 2.

Referring now to FIGS. 2 and 3, accessory clamp assembly 27 of the preferred embodiment of the present invention is illustrated. Accessory clamp assembly 27 includes an upper clamping member 28 having an upper arm 30 for operatively engaging first surface 14a of first clamping region 14. Similarly, accessory clamp assembly 27 further includes a lower clamping member 32 having a lower arm 34 for operatively engaging second surface 14b of first clamping region 14. A first attachment region 36 is provided for affixing upper clamping member 28 to lower clamping member 32. An array of materials and methods that are known to those skilled in the art can be employed to use first attachment region 36 to secure upper clamping member 28 to lower clamping member 32, such as fasteners 37.

Figure 4:
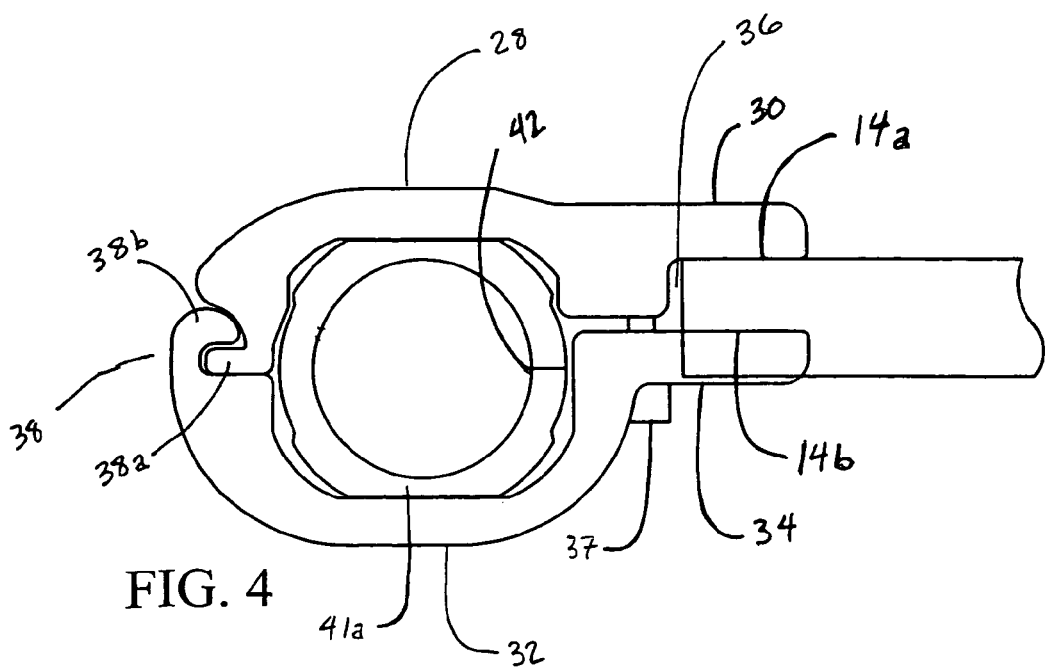
FIG. 4 is a sectional view illustration of the accessory clamp of FIG. 2 with an insert.

As shown in FIG. 4, fasteners 37 are preferably adjustable so as to permit a tightening of the frictional fit between upper arm 30, first surface 14a of first clamping region 14, lower arm 34, and second surface 14b of first clamping region 14.

Referring back to FIGS. 2 and 3, as well as FIG. 4, a second attachment region 38 for affixing upper clamping member 28 to lower clamping member 32 is further provided. As is illustrated in FIGS. 2, 3, and 4, second attachment region 38 incorporates first engagement arm 38a and second engagement arm 38b. First engagement arm 38a is formed as a portion of upper clamping member 28 and is positioned opposite upper arm 30 with respect to upper clamping member 28. Likewise, second engagement arm 38b is formed as a portion of lower clamping member 32 and is positioned opposite lower arm 34 with respect- to lower clamping member 32.

Preferably, first engagement arm 38a and second engagement arm 38b are arranged in a slidable engagement, or, alternatively in a clam shell opening engagement. The slidable engagement permits the user to position accessory clamp assembly 27 around an attachment substrate, such as a portion of metal tubing on a boat, with relative ease by positioning upper clamping member 28 over the attachment substrate then sliding lower clamping member 32 into position so that first engagement arm 38a and second engagement arm 38b are placed in a slidable engagement. Once the slidable engagement between first engagement arm 38a and second engagement arm 38b is completed, fasteners 37 are preferably positioned so as to frictionally secure accessory clamp assembly 27 to the attachment substrate. Likewise, by using a claim shell-like engagement upper clamping member 28 and lower clamping member 32 can operate as a hinge, with first engagement arm 38a and second engagement arm 38b in a hinging engagement. The hinging engagement permits upper clamping member 28 and lower clamping member 32 to wrap around a portion of metal tubing on a boat. However, unlike a traditional hinge, the hinging engagement between upper clamping member 28 and lower clamping member 32 is not susceptible to the wear or deterioration from exposure to the elements.

Figure 5:
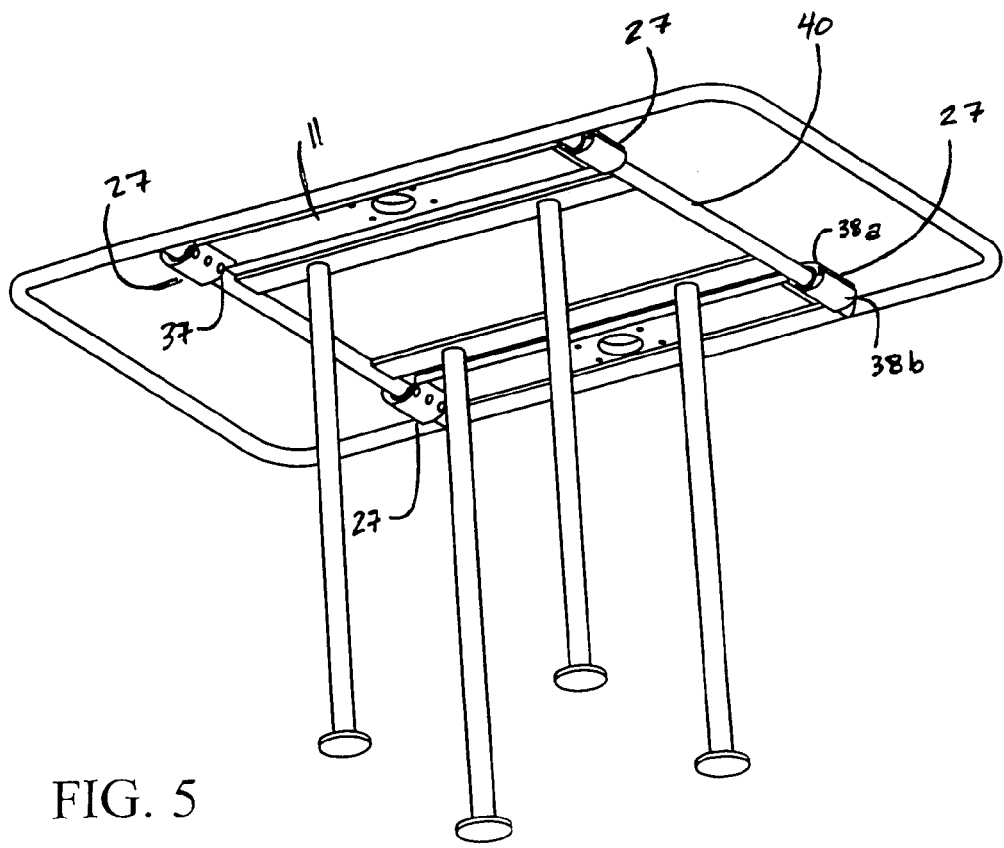
FIG. 5 is an isometric view of the clamp-on multi-purpose support plate in operative engagement with the accessory clamp in accordance with preferred embodiment of the present invention on a T-top.

Referring now to FIG. 5, the preferred embodiment of the present invention is shown in operation. As illustrated in FIG. 5, accessory clamps assembly 27 is demonstrated frictionally secured to attachment substrate 40. Preferably, accessory clamps 27 are engaged in pairs multipurpose support plate 11. As detailed above, attachment substrate 40 is preferably a portion of a boat, such as tubing, that is common for use as a support structure. FIG. 5 illustrates that first engagement arm 38a and second engagement arm 38b are arranged in an engagement with respect to one another around attachment substrate 40. In order to facilitate a good fit and reduce the amount of slip along attachment substrate 40, fasteners 37 (shown in FIGS. 3 and 4) are tightened.

Tightening fasteners 37 also reduces the distance between upper arm 30 and lower arm 34 so as cause upper arm 30 to operatively engage first surface 14a of first clamping region 14 and lower arm 34 to operatively engage second surface 14b of first clamping region 14. The resulting operative engagement between upper arm 30, first surface 14a, lower arm 34, and second surface 14b results in a friction fit between multi-purpose support plate 11 and accessory clamp assembly 27 (as shown in FIG. 7). This resulting combination eliminates the need for welding or otherwise permanently affixing multi-purpose support plate 11 to attachment substrate 40, thereby permitting multi-purpose support plates to be moved to and from various locations on a boat. Additionally, as illustrated in FIGS. 6 and 7, lips 20a and 20b prevent multi-purpose support plate 11 from shifting side to side when secured between upper arm 30 and lower arm 34 of accessory clamp assembly 27.

Figure 6:
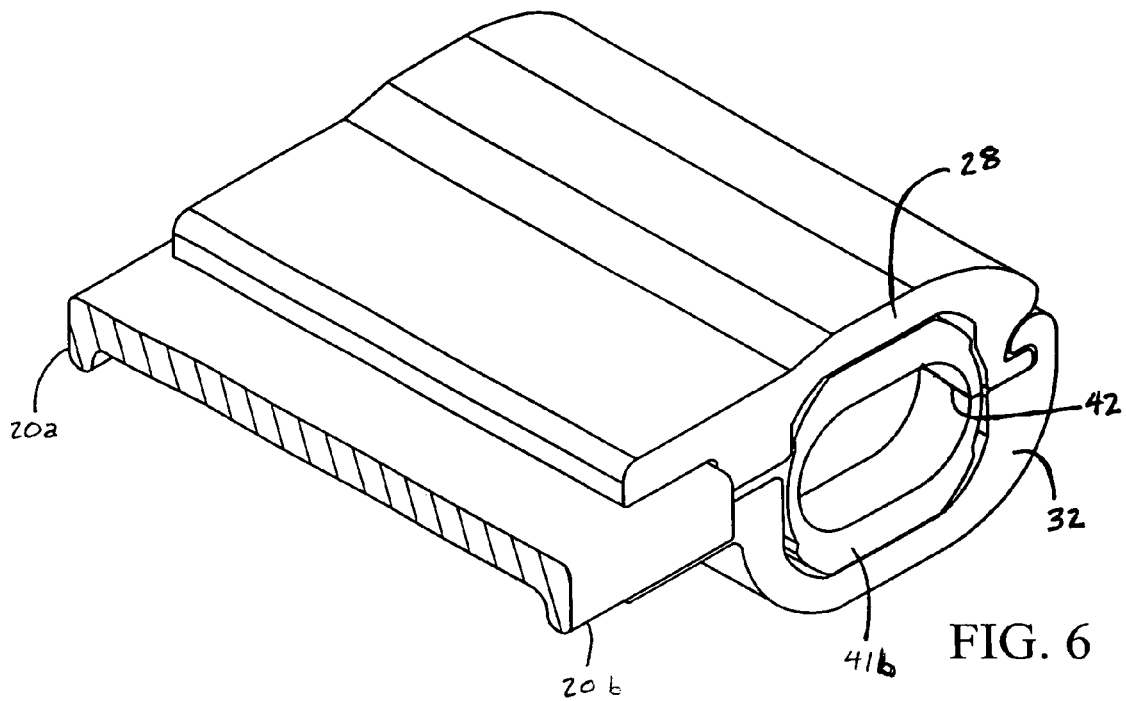
FIG. 6 is an isometric view of the mating relationship of clamp and support plate on attached to a pipe.
Figure 7:
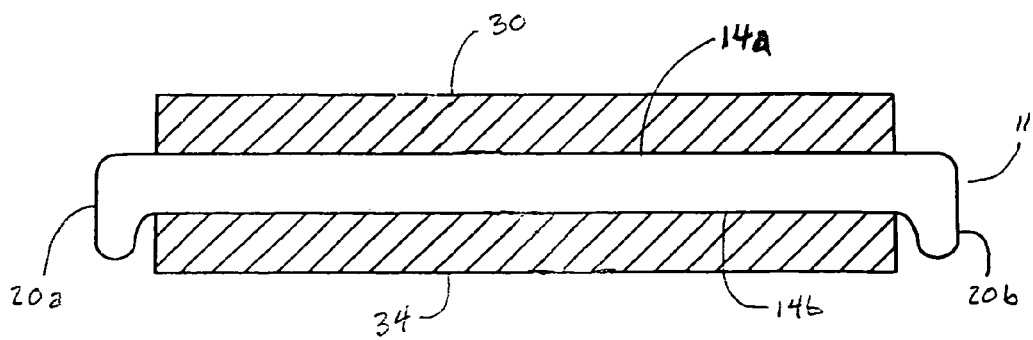
FIG. 7 is a front view of the mating relationship of FIG. 6.
Figure 8:
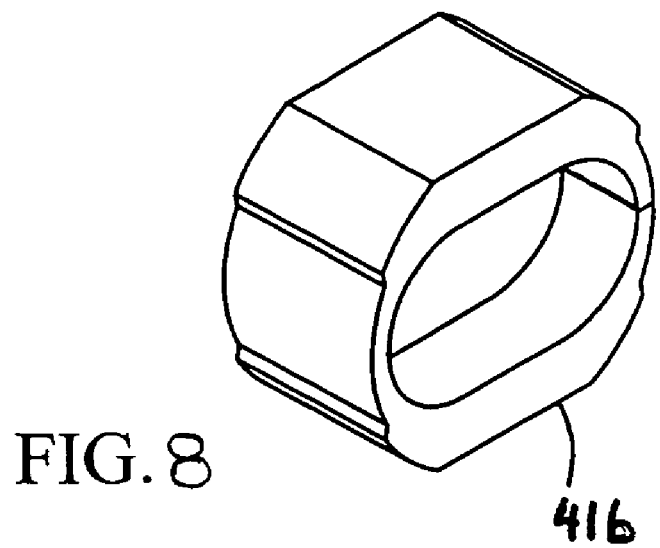
FIG. 8 is a side view of reducer for a large tube.
Figure 9:
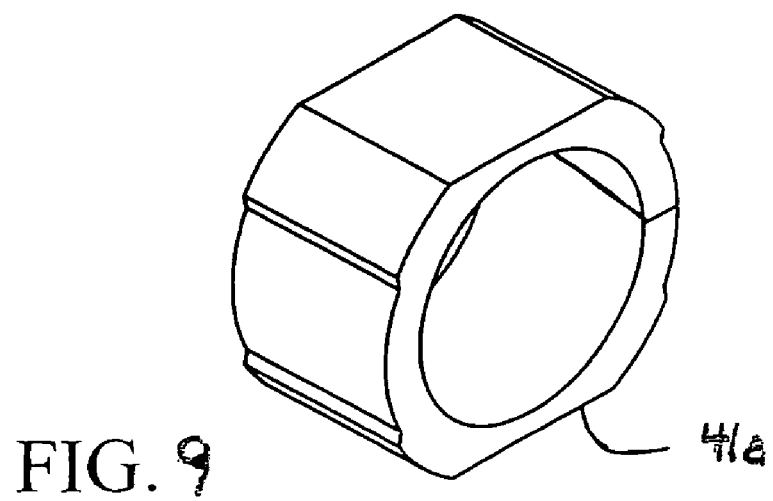
FIG. 9 is a side view of reducer for a small tube.

Referring now to FIG. 4 and accessory clamp assembly 27 is illustrated engaging a reducer, reducer 41a in FIGS. 4 and 8 and reducer 41b in FIGS. 6 and 7. Reducers 41a and 41b are employed so that clamp assembly 27 can engage a variety of tubings having differing circumferences, including tubing having substantially circular circumferences and tubing having substantially oval circumferences. Reducer 41a of FIGS. 4 and 8, for example, can be utilized so that accessory clamp assembly 27 can engage tubing of a first diameter, thereby permitting accessory clamp assembly 27 to be used in connection with tubing that would otherwise allow accessory clamp assembly 27 to slide thereon. Similarly, reducer 41b permits accessory clamp assembly 27 to engage tubing of a second, smaller diameter than reducer 41b. Reducers 41a and 41b are preferably constructed from a resilient flexible material that is bendable an yet capable of retaining its shape. Additionally, reducers 41a and 41b function as insulators, and prevent abrasion between accessory clamp assembly 27 and the tubing. Preferably, the material forming reducers 41a and 41b has a shore A durometer ranging from about 40 to about 120, with a preferred range of about 50 to about 75. Additionally, reducers 41a and 41b incorporate a cut line 42, thereby permitting reducers 41a and 41b to be stretched around the tubing, such as tubing 40 of FIG. 5.

Providing the user with a variety of reducers, such as reducers 41a and 41b, in one package allows for a significant reduction in the number of stockkeeping units (often referred to as "SKUs"). Thus, a retailer is not required to keep track of more SKUs than is necessary.

Although only a few exemplary embodiments of the present invention have been described in detail above and in the following Figures, those skilled in the art will readily appreciate that numerous modifications to the exemplary embodiments are possible without materially departing from the novel teachings and advantages of this invention. Accordingly, all such modifications are intended to be included within the scope of this invention as defined in the following claims.

What is claimed is:

1. A method for supporting a boating accessory, said method comprising the steps of:
    providing a multi-purpose support plate having at least one bore therethrough;
    clamping said multi-purpose support plate to a surface of a boating structure with an accessory clamp assembly, said accessory clamp assembly incorporating a first reducer accommodating a tubing having a first circumference; and
    wherein said multi-purpose support plate is clamped on at least one clamping region of said multi-purpose support plate.

2. The method according to claim 1 wherein said accessory clamp assembly incorporates a second reducer.

3. The method according to claim 2 wherein said second reducer accommodates a tubing having a second circumference.

* * * * *